United States Patent
Lakshmanan et al.

(10) Patent No.: US 11,354,252 B2
(45) Date of Patent: Jun. 7, 2022

(54) ON-DEMAND CACHE MANAGEMENT OF DERIVED CACHE

(71) Applicant: Oracle International Corporation, Redwood Shores, CA (US)

(72) Inventors: Hariharan Lakshmanan, Belmont, CA (US); Dhruvil Shah, Sunnyvale, CA (US); Prashant Gaharwar, San Mateo, CA (US); Shasank K. Chavan, Menlo Park, CA (US); Tirthankar Lahiri, Palo Alto, CA (US); Saraswathy Narayan, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/144,926

(22) Filed: Sep. 27, 2018

(65) Prior Publication Data
US 2019/0095346 A1 Mar. 28, 2019

Related U.S. Application Data

(60) Provisional application No. 62/564,846, filed on Sep. 28, 2017.

(51) Int. Cl.
*G06F 12/12* (2016.01)
*G06F 16/24* (2019.01)
(Continued)

(52) U.S. Cl.
CPC .......... *G06F 12/126* (2013.01); *G06F 12/12* (2013.01); *G06F 16/172* (2019.01);
(Continued)

(58) Field of Classification Search
CPC ........... G06F 16/24552; G06F 16/172; G06F 16/2282; G06F 2212/1021; G06F 2212/1044
See application file for complete search history.

(56) References Cited

U.S. PATENT DOCUMENTS 6,728,719 B1 * 4/2004 Ganesh ............ G06F 16/24552
7,669,029 B1    2/2010 Mishra
(Continued)

FOREIGN PATENT DOCUMENTS

WO    WO 03/107222 A1    12/2003
WO    WO 2008/091705 A2    7/2008
WO    WO 2015/069941 A1    5/2015

OTHER PUBLICATIONS

Application of In-Memory Database in Reporting of the Banking Information System by Hadzi (Year: 2016).*

(Continued)

*Primary Examiner* — Paul M Knight
(74) *Attorney, Agent, or Firm* — Hickman Becker Bingham Ledesma LLP

(57) ABSTRACT

Techniques related to automatic cache management are disclosed. In some embodiments, one or more non-transitory storage media store instructions which, when executed by one or more computing devices, cause performance of an automatic cache management method when a determination is made to store a first set of data in a cache. The method involves determining whether an amount of available space in the cache is less than a predetermined threshold. When the amount of available space in the cache is less than the predetermined threshold, a determination is made as to whether a second set of data has a lower ranking than the first set of data by at least a predetermined amount. When the second set of data has a lower ranking than the first set of data by at least the predetermined amount, the second set of data is evicted. Thereafter, the first set of data is cached.

20 Claims, 7 Drawing Sheets

(51) Int. Cl.
  *G06F 12/126* (2016.01)
  *G06F 16/22* (2019.01)
  *G06F 16/2455* (2019.01)
  *G06F 16/172* (2019.01)

(52) U.S. Cl.
  CPC .... *G06F 16/2282* (2019.01); *G06F 16/24552* (2019.01); *G06F 2212/1021* (2013.01); *G06F 2212/1044* (2013.01)

(56) References Cited

U.S. PATENT DOCUMENTS

| | | | |
|---|---|---|---|
| 9,292,564 | B2 | 3/2016 | Kamp et al. |
| 9,384,227 | B1 | 7/2016 | Xiao |
| 2006/0020616 | A1 | 1/2006 | Hardy |
| 2006/0047719 | A1 | 3/2006 | Hershkovich |
| 2007/0220201 | A1* | 9/2007 | Gill ................. G06F 12/123 711/113 |
| 2008/0189303 | A1 | 8/2008 | Bush et al. |
| 2012/0265738 | A1 | 10/2012 | Beckmann |
| 2014/0095775 | A1* | 4/2014 | Talagala ............ G06F 12/0246 711/103 |
| 2014/0195720 | A1 | 7/2014 | Akella |
| 2015/0088830 | A1* | 3/2015 | Kamp ................ G06F 11/2058 707/648 |
| 2016/0321288 | A1* | 11/2016 | Malhotra ............... G06F 16/22 |
| 2016/0371190 | A1* | 12/2016 | Romanovskiy ......... G06F 3/067 |
| 2017/0017683 | A1 | 1/2017 | Fourny et al. |
| 2017/0060973 | A1 | 3/2017 | Liu et al. |
| 2018/0011893 | A1 | 1/2018 | Kimura |
| 2018/0032430 | A1* | 2/2018 | Malladi ................ G06F 12/023 |
| 2018/0067853 | A1 | 3/2018 | Mukherjee et al. |
| 2020/0210398 | A1 | 7/2020 | Liu |

OTHER PUBLICATIONS

Oracle's In-Memory Database Strategy for OLTP and Analytics by Lahiri (Year: 2015).*
Oracle Database In-Memory: A Dual Format In-Memory Database by Lahiri (Year: 2015).*
Accelerating Analytics with Dynamic In-Memory Expressions by Mishra (Year: 2016).*
Improving Cloud System Performances by Adopting NVRAM-Based Storage Systems by Kim (Year: 2016).*
Query Optimization in Oracle 12c Database In-Memory by Das (Year: 2015).*
A Trigger-Based Middleware Cache for ORMs (Year: 2011).*
Marwah, U.S. Appl. No. 14/922,086, filed Oct. 23, 2015, Office Action dated Dec. 14, 2017.
Marwah, U.S. Appl. No. 14/922,086, filed Oct. 23, 2015, Interview Summary dated Feb. 14, 2018.
Marwah, U.S. Appl. No. 14/922,086, filed Oct. 23, 2015, Final Office Action dated Jun. 14, 2018.
Marwah, U.S. Appl. No. 14/922,086, filed Oct. 23, 2015, Advisory Action dated Sep. 19, 2018.
Shukla et al., "Schema-Agnostic Indexing with Azure DocumentDB", Proceedings of the VLDB Endowment, vol. 8, No. 12, Copyright 2015 VLDB, 12 pages.
Oracle Database, "Introduction to Simple Oracle Document Access (SODA)", 18c E86033-04, dated Aug. 2018, 96 pages.
Li et al., "Closing the functional and Performance Gap between SQL and NoSQL", ACM 978-1-4503-3531-7, dated Jun. 26, 2016, 12 pages.
Kleppmann et al., "A Conflict-Free Replicated JSON Datatype", dated Aug. 15, 2017, 17 pages.
Chasseur et al., "Enabling JSON Document Stores in Relational Systems", WebDB dated 2013, New York, New York, USA, 16 pages.
Marwah, U.S. Appl. No. 14/922,086, filed Oct. 23, 2015, Final Office Action dated Aug. 21, 2019.
Marwah, U.S. Appl. No. 14/922,086, filed Oct. 23, 2015, Interview Summary dated Oct. 24, 2019.
Liu, U.S. Appl. No. 16/690,817, filed Nov. 21, 2019, Office Action, dated Feb. 4, 2021.
Liu, U.S. Appl. No. 16/690,817, filed Nov. 21, 2019, Final Office Action, dated Jun. 16, 2021.
Liu, U.S. Appl. No. 16/690,817, filed Nov. 21, 2019, Advisory Action, dated Jul. 28, 2021.
Liu, U.S. Appl. No. 16/690,817, filed Nov. 21, 2019, Notice of Allowance and Fees Due, dated Aug. 23, 2021.
Liu, U.S. Appl. No. 16/690,817, filed Nov. 21, 2019, Notice of Allowability, dated Sep. 15, 2021.

* cited by examiner

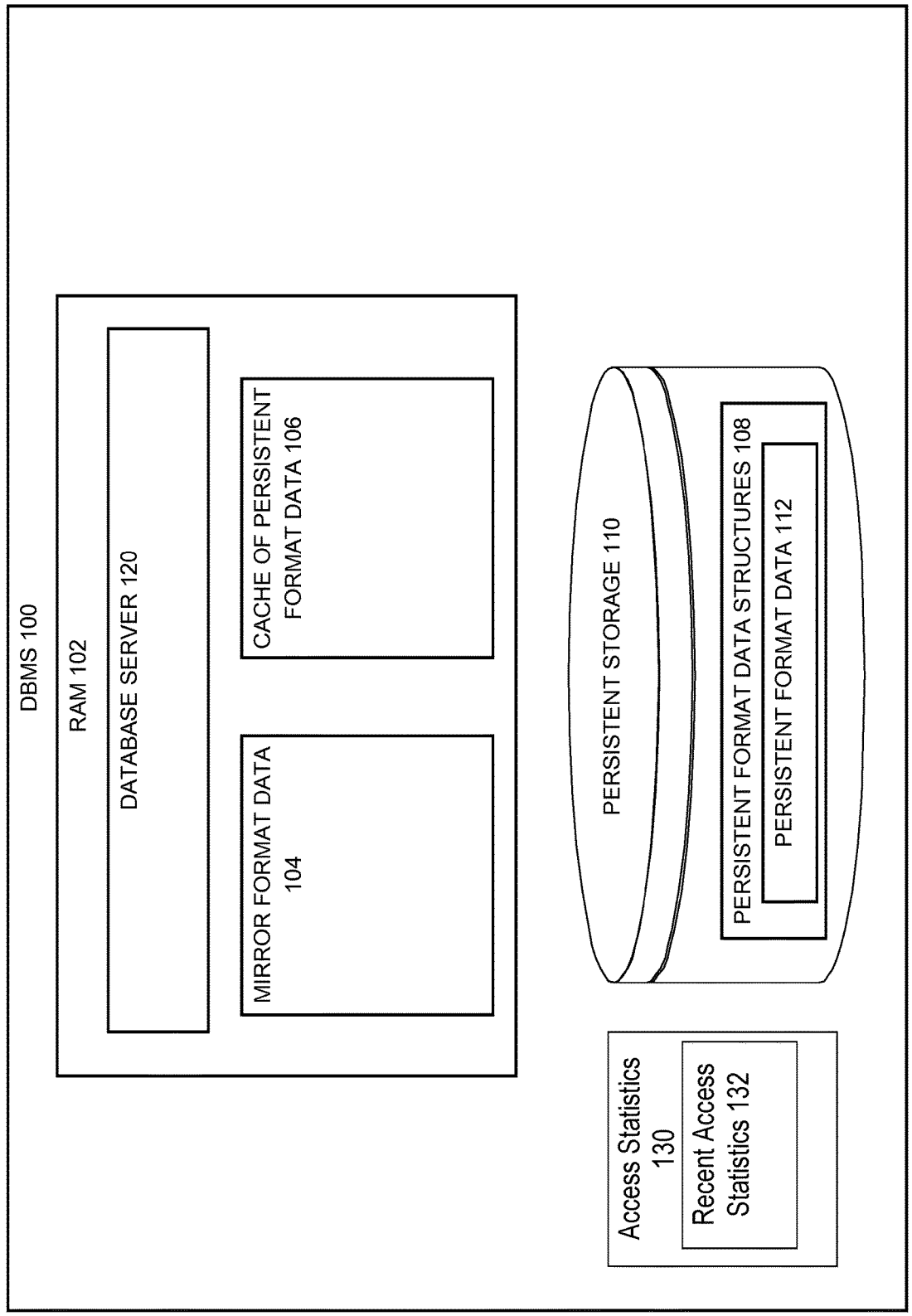

| TABLE 200 | C1 | C2 | C3 | C4 |
|---|---|---|---|---|
| R1 | R1C1 | R1C2 | R1C3 | R1C4 |
| R2 | R2C1 | R2C2 | R2C3 | R2C4 |
| R3 | R3C1 | R3C2 | R3C3 | R3C4 |
| R4 | R4C1 | R4C2 | R4C3 | R4C4 |
| R5 | R5C1 | R5C2 | R5C3 | R5C4 |
| R6 | R6C1 | R6C2 | R6C3 | R6C4 |
| R7 | R7C1 | R7C2 | R7C3 | R7C4 |
| R8 | R8C1 | R8C2 | R8C3 | R8C4 |

FIG. 2A

ON-DEMAND CACHE MANAGEMENT OF DERIVED CACHE

CROSS-REFERENCE TO RELATED APPLICATIONS; BENEFIT CLAIM

This application claims the benefit of Provisional Application 62/564,846, filed Sep. 28, 2017, the entire contents of which is hereby incorporated by reference as if fully set forth herein, under 35 U.S.C. § 119(e).

TECHNICAL FIELD

Embodiments are generally related to information storage and retrieval technology. More specifically, embodiments are related to cache management of a derived cache in a database management system (DBMS).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Derived Cache in a Database Server One way to dramatically improve computation of queries in an object-relational database system is to pre-load and retain a database table in a derived cache. In a derived cache, an in-memory version of at least a portion of a database table that is stored in a persistent form may be mirrored in lower latency random access memory (RAM) of a database server in column-major format. In column-major format, a representation of a portion of the column values of a column is stored in a column vector, which occupies a contiguous address range in RAM.

Query operations involving a column, such as predicate evaluation and aggregation on the column, may be performed faster on an in-memory column vector of the column for several reasons. First, the column vector is maintained in lower latency memory where it may be accessed more quickly. Second, runs of column values upon which query operations operate are stored contiguously in memory in a column vector. In addition, column vectors are compressed to reduce memory needed to store a column. Dictionary compression is often used to compress column vectors.

Dictionary compression may also be exploited by compressed-columnar algorithms that are optimized for performing query operations on compressed column vectors to further increase the speed with which such query operations are performed on a column. Other forms of compression may also be exploited by compressed-columnar algorithms.

An example of a derived cache is described in, for example, U.S. application Ser. No. 14/337,179, Mirroring, In Memory, Data From Disk To Improve Query Performance, filed on Jul. 21, 2014 by Jesse Kamp, et al. and issued on Mar. 22, 2016 as U.S. Pat. No. 9,292,564, (the "Mirroring Application"), the entire contents of which are incorporated herein by reference.

Cache Management

A derived cache improves cache containment. Cache containment refers to limiting accesses to database data needed for executing database statements to accesses within the derived cache. In general, the higher degree of cache containment for executing database statements, the greater the realization of the benefits of the derived cache, which leads to faster execution of the queries. In general, cache containment is improved when the derived cache caches the most often accessed database data.

For a variety of reasons, the most often accessed database data may not be cached. One reason is that it may be difficult for database administrators to determine which database data will be accessed most often by database statements. For example, some database systems enable administrators to specify, via DDL (Data Definition Language) instructions, which data is eligible for in-memory caching. However, administrators may have limited ability or availability to predict which data will be useful for query evaluation and thus overestimate the amount of useful data.

Another reason why some of the most-accessed database data may not be cached is that existing cache management techniques are insufficiently responsive to changing workload patterns. For example, some database systems use access statistics for cache repopulation at predetermined time intervals. Periodic cache repopulation is described in U.S. application Ser. No. 14/922,086, Periodic Performance Optimization through Heatmap Based Management of an In-Memory Area, filed Oct. 23, 2015, by Vineet Marwah et al., the entire contents of which are incorporated herein by reference. However, repopulating a cache only periodically means the derived cache may not cache the most accessed database data between repopulations.

BRIEF DESCRIPTION OF THE DRAWINGS

In the drawings:

FIG. 1 depicts an example database system, according to an embodiment of the present invention.

FIG. 2A depicts row-major storage of table data, according to an embodiment of the present invention.

Figure 2B:
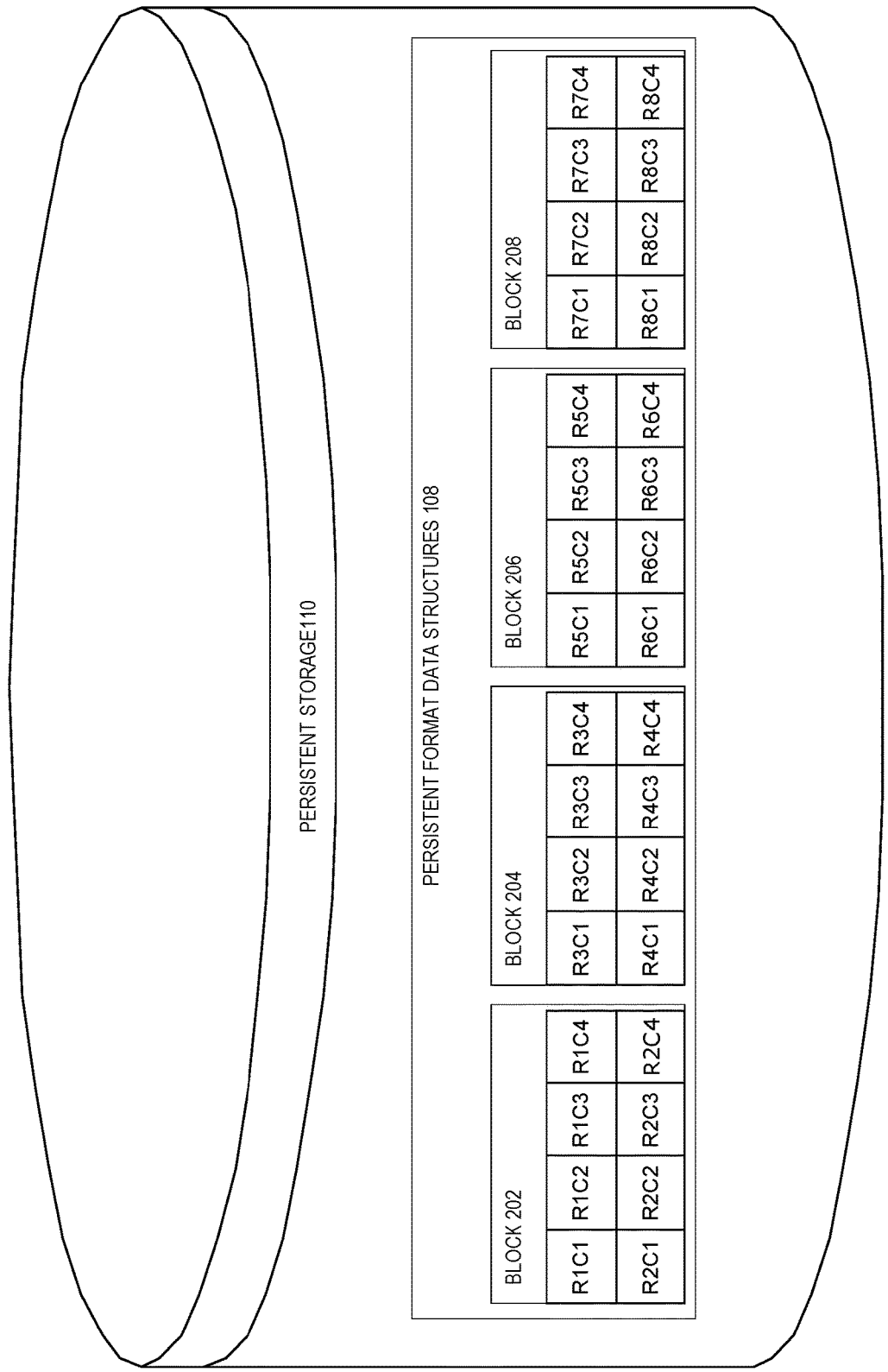
FIG. 2B depicts how table data stored in row-major storage format is physically organized, according to an embodiment of the present invention.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that embodiments of the present disclosure may be practiced without these specific details. Modifiers such as "first" and "second" are used to differentiate elements and do not necessarily indicate any particular order.

Introduction

Described herein are techniques related to on-demand cache management of derived cache. On-demand cache management can obviate the need for database administrators to determine which database data will be accessed by future queries. Instead, a database administrator may simply specify that which database data is eligible for caching in a derived cache. The DBMS automatically maintains in real time which of the eligible database data should be in the derived cache based on current activity against the database. This is achieved in in part by tracking recent accesses to the eligible database data eligible. When eligible database data is accessed and is not cached, the eligible database data may be loaded into the cache in place of database data already in-cache that is less beneficial for cache containment. Thus, cache population and/or repopulation is performed with increased responsiveness to changing workload patterns.

System Overview

According to an embodiment, a derived cache is implemented within a DBMS using an in-memory database architecture that keeps the PF data and the MF data transactionally consistent. Such an in-memory database architecture is described in detail in the Mirroring Application. The Mirroring Application describes, among other things, maintaining multiple copies of the same data items, where one copy is maintained in a persistent form, and another copy is maintained in volatile memory.

FIG. 1 is a block diagram of a database system according to an embodiment. Referring to FIG. 1, DBMS 100 includes RAM 102 and persistent storage 110. RAM 102 generally represents RAM used by the DBMS and may be implemented by any number of memory devices, including volatile and non-volatile memory devices, and combinations thereof.

Persistent storage 110 generally represents any number of persistent block-mode storage devices, such as magnetic disks, FLASH memory, solid state drives, or non-volatile RAM that is accessible through a block-mode interface to read or write data blocks stored thereon.

Within DBMS 100, a database server 120 executes a database statement that is submitted to the database server by one or more database applications (not shown). The data used by those applications is illustrated as PF data 112. PF data 112 resides in persistent storage 110 in PF data structures 108. The PF data structures 108 may be, for example, row-major data blocks. While row-major data blocks are used for the purposes of illustration, the PF structures may take any form, such as a column-major data block, hybrid compression units, etc.

RAM 102 further includes a buffer cache 106 of PF data. Within buffer cache 106, the data is stored in a format that is based on the format in which the data resides within the PF data structures 108. For example, if the persistent format is row-major data blocks, then buffer cache 106 may contain cached copies of row-major data blocks.

On the other hand, MF data 104 is in a format that is different than the persistent format. In an embodiment where the persistent format is row-major data blocks, the mirror format may be column-major. Because the mirror format differs from the persistent format, MF data 104 is produced by performing transformations on the PF data. These transformations occur both when RAM 102 is initially populated with MF data 104 (whether at start-up or on-demand), and when RAM 102 is re-populated with MF data 104 after a failure.

Significantly, the existence of MF data 104 may be transparent to the database applications that submit database commands to the database server that makes use of the DBMS that operate exclusively on PF data 112. Furthermore, transparent to those applications, that database server may use MF data 104 to more efficiently process some or all of those database statements.

Access statistics 130 tracks access to MF data and/or PF data at various levels of granularity. Access statistics 130 includes recent access statistics 132, which tracks recent accesses to MF data and/or PF data. Access statistics 130 is described in further detail below.

The Mirror Format Data

MF data 104 may mirror all of PF data 112, or a subset thereof. In one embodiment, a user may specify what portion of PF data 112 is "in-memory enabled". Data that is not in-memory enabled is not mirrored in MF data 104. Consequently, when such data is required by execution of a database statement, the database server does not have the option of obtaining the data from MF data 104.

The specification of what portions of PF data are in-memory enabled may be made at any level of granularity, including for columns and row ranges, partitions, and segments. In addition, the user may specify a caching priority indicating a priority of caching a portion of PF data 112 as MF data relative to the other portions of PF data 112. The specification of what portions of PF data 112 are in-memory enabled and the caching priority ranking of each may be stored in a database dictionary of DBMS 100. The database dictionary may be updated to reflect these properties through data definition language ("DDL") statements.

As shall be described hereafter, in-memory enabled PF data is converted to the mirror format and stored as MF data 104 in RAM 102. The term in-memory enabled database data is used to refer to in-memory enabled PF data and any portion thereof that is cached as MF data in a derived cache. When in-memory enabled database data is required by a database statement, the database server has the option of providing the data from either PF data 112 or MF data 104. Database data that is not in-memory enabled is not mirrored in MF data 104. Consequently, when such data is required by a database statement, the database server does not have the option of obtaining the data from MF data 104.

For the purpose of explanation, it shall be assumed that PF data structures 108 include the table 200 illustrated in FIG. 2A. Table 200 includes four columns C1, C2, C3, and C4, and eight rows R1, R2, R3, R4, R5, R6, R7, and R8.

A row within persistent storage may be uniquely identified by a row-id. In table 200, the first row is associated with row-id R1; the last row is associated with row-id R8. A column of a row may be referred to herein by a concatenation of row-id and column. For example, column C1 of row R1 is identified by R1C1, and C3 of R5 is identified by R5C3.

FIG. 2B illustrates how the data that resides in table 200 may be physically organized on persistent storage 110. In the present example, the data for table 200 is stored in four row-major data blocks 202, 204, 206, and 208. Block 202 stores the values for all columns of row R1, followed by the values for all columns of row R2. Block 204 stores the values for all columns of row R3, followed by the values of all columns of row R4. Block 206 stores the values of all columns of row R5, followed by the values of all columns of row R6. Finally, block 208 stores the values of all columns of row R7, followed by the values of all columns of row R8.

Copies of data blocks may be temporarily stored in buffer cache 106. Buffer cache 106 may be managed using any one of a variety of cache management techniques.

Derived Cache & IMCUs

According to an embodiment, MF data 104 is cached and maintained within a derived cache. Within a derived cache, MF data 104 is stored in units referred to herein as an in-memory compression unit (IMCU). Each IMCU stores a different set of MF data.

Figure 3:
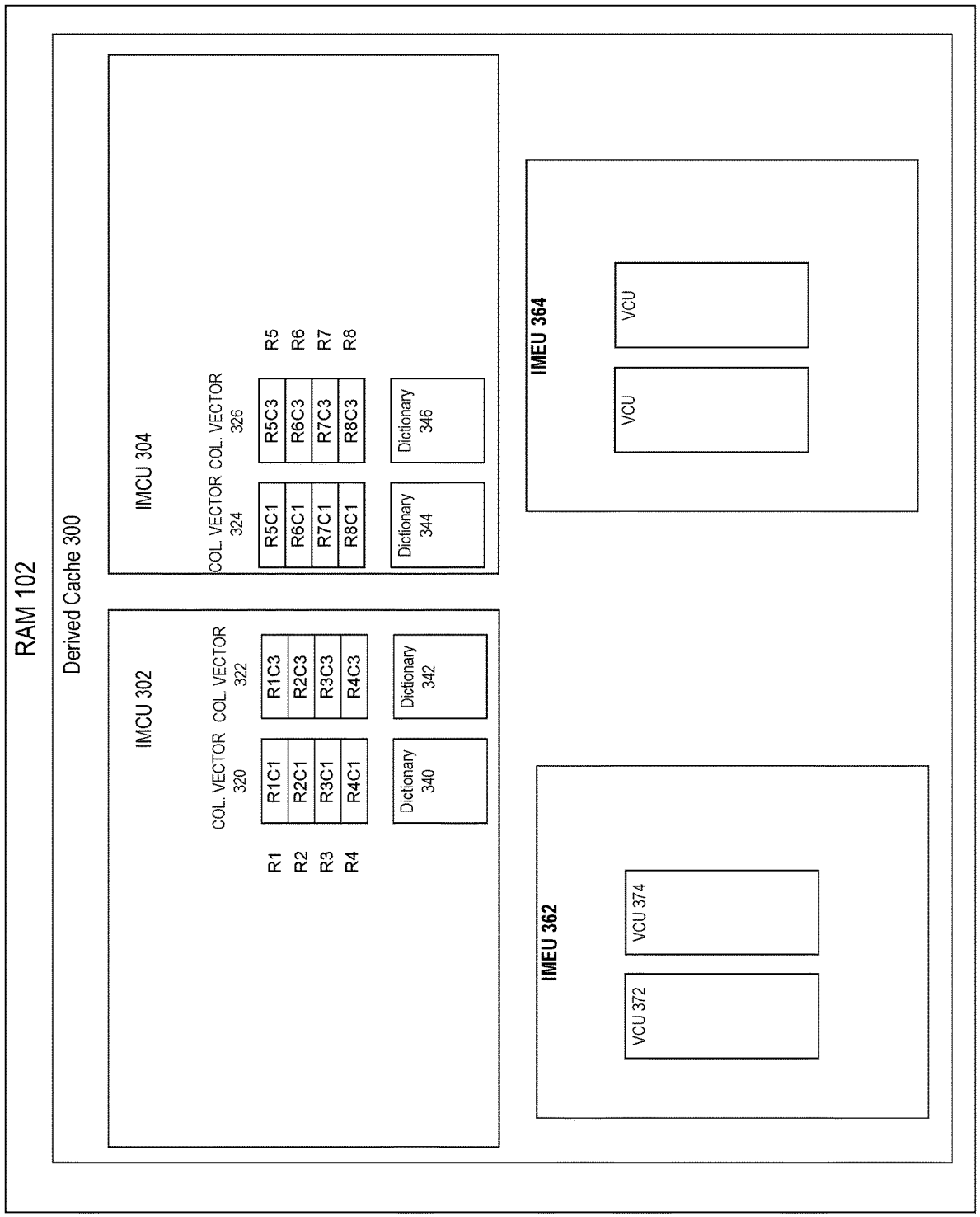
FIG. 3 depicts an example on-demand cache manager, according to an embodiment of the present invention.

FIG. 3 depicts within RAM 102 a derived cache 300. As illustrated in FIG. 3, derived cache 300 comprises IMCU 302 and IMCU 304.

According to an embodiment, IMCUs are created from units of in-memory enabled PF data referred to herein in-memory enabled PF elements. An in-memory enabled PF element may correspond to a set of contiguous data blocks (i.e., within a contiguous address space of persistent storage), referred to herein as an extent. A set of one or more extents is referred to herein as a segment. According to an embodiment, a segment stores data from a database table. A database dictionary defines what segment stores data for what database table. An example of an in-memory enabled PF element is "to-be-mirrored elements" described in Periodic Performance Optimization through Heatmap Based Management of an In-Memory Area. An IMCU may be generated from one in-memory enabled PF element or from multiple in-memory enabled PF elements. A single in-memory enabled PF element may only be cached in one IMCU of derived cache 300.

IMCU 302 holds MF data from an in-memory enabled PF element comprising rows R1-R4, and IMCU 304 holds MF data from an in-memory enabled PF element comprising rows R5-R8. IMCU 302 holds column values for C1 for rows R1-R4 in column vector 320 and column values for C3 for rows R1-R4 in column vector 322. IMCU 304 holds column values for C1 for rows R5-R8 in column vector 324 and column values for C3 for rows R5-R8 in column vector 326.

In an embodiment, a derived cache may include an "in-memory expression unit" (IMEU) for each of one or more of the IMCUs in the derived cache. A IMEU stores precomputed results of expressions that are applied to the column vectors of an IMCU. The precomputed results are stored in one or more virtual columns (VCUs).

IMEU 362 is associated with IMCU 302 and stores precomputed results of expressions applied to column vectors 320 and column vector 322 in VCU 372 and VCU 374. Similarly, IMEU 364 is associated IMCU 304 and stores pre-computed results in VCUs. IMEUs are described in further detail in Materializing Expressions Within In-Memory Virtual Column Units to Accelerate Analytic Queries, U.S. application Ser. No. 15/146,799, filed by Aurosish Mishra, et al., on May 4, 2016, the entire contents of which are incorporated by reference.

Compression in IMCUs

The column vectors depicted in derived cache 300 are dictionary compressed. In dictionary based compression of a column, a value is represented by a dictionary code, which is typically much smaller than the value the dictionary code represents. A dictionary maps dictionary codes to values. In a column vector of a column, occurrences of a value in a column are represented by a dictionary code within the column vector that is mapped by the dictionary to the value.

Other forms of compression may be used to compress a column vector. For example, run-length encoding may be used.

According to an embodiment, each IMCU encodes a column vector according to a dictionary for that column vector. Column vector 320 and column vector 324 are encoded according to dictionary 340 and 342, respectively, and column vector 324 and column vector 326 are encoded according to dictionary 344 and 346, respectively.

Access Statistics

To manage population and retention of MF data in derived cache 300, DBMS 100 generates and maintains access statistics 130. Access statistics 130 includes recency access statistics 132, which comprises statistical metadata characterizing access to in-memory enabled database data within a most recent window of time. The window of time is configurable by a database administrator through, for example, DDL instructions.

As mentioned previously, in-memory enabled database data refers to both PF data and any portion thereof that is cached in derived cache 300. Thus, for a database table that is memory enabled, recency access statistics 132 reflects recent access to the database table whether access for the database table is made to one or more IMCUs caching the database table or an in-memory enabled PF element storing data for the database tables. Recency access statistics 132 tracks access at a granularity of in-memory enabled PF element, or a portion of one in-memory enabled PF element.

Access statistics 130 may include access data other than recency access statics. For example, access statistics may include metadata indicating what fraction of MF data has been modified in each IMCU of derived cache 300.

Recency access statistics 132 may include metadata about the following.

A heatmap indicating data access patterns for in-memory enabled database tables.

Data access patterns for in-memory enabled columns of in-memory enabled database tables.

Tallies of operations (e.g., INSERT, UPDATE, and DELETE operations) in-memory database tables.

Other examples of metadata are described Periodic Performance Optimization through Heatmap Based Management of an In Memory Area in for example, the section VALUES IN THE PERFORMANCE MODEL.

PF-Side Processing

A database system may operate by responding to a query by first searching for the requested data in buffer cache 106. If the data is in buffer cache 106, the data is accessed from buffer cache 106. Otherwise, the needed data is loaded from PF data structures 108 into buffer cache 106, and then accessed from buffer cache 106. However, because the data in both buffer cache 106 and PF data structures 108 is in the persistent format, performing operations based exclusively on the PF data does not always provide the best performance. Performing an operation in this way against PF data is referred to herein as PF-side processing.

According to an embodiment, the database server uses the derived cache 300 to perform at least some of the database operations needed to execute a database statement. Such operations include predicate evaluation, projection, and aggregation. The greater the portion of database accesses needed for execution of the query that can be satisfied using the derived cache, the greater the cache containment.

For a database, some MF data in an IMCU may be transactionally consistent, and other MF data may not be transactionally inconsistent. To execute database operations for a database statement using the MF data in the IMCU, the transactional inconsistent portion of the MF data is not used. Instead, PF-side processing against PF data corresponding to the transactional inconsistent MF data is used to perform the database operations. The greater the portion of MF data in an IMCU that is transactional inconsistent, the more PF side processing performed, thereby lessening cache containment.

Loading of MF Data in General

The loading of PF data as MF data in derived cache 300 may occur at the time DBMS 100 is started, or periodically. Loading of PF data in this way is described in Periodic Performance Optimization through Heatmap Based Management of an In-Memory Area. Generally, when loading PF data into MF data, a "cache loading task" is generated and assigned to one or more database processes to load PF data. Loading PF data may entail generating multiple cache loading tasks, each entailing loading a portion of in-memory enabled PF data.

There may be more in-memory enabled PF data than can be cached in the derived cache 300. In this situation, a determination is made of which portions of PF Data to cache in the derived. In general, portions that are cached are those determined to potentially increase cache containment relative to other portions of PF data.

On-Demand Derived Cache Management Based on Cache Benefit Value

To execute a database statement, a portion of in-memory enabled database data that needs to be accessed may not be cached in derived cache 300. When a portion of in-memory enabled database data is not cached in a derived cache, that portion is referred to herein as being "uncached"; uncached in-memory enabled database data may be simply be referred to herein as uncached-enabled data. Accessing uncached-enabled database data requires accessing its persistent form. Accessing a persistent form of a portion of in-memory enabled database data because the portion is uncached is referred to herein as a derived cache miss.

According to an embodiment of the present invention, when a derived cache miss is encountered for a portion of in-memory enabled database data, a determination is made of whether to evict an IMCU in derived cache 300 and replace the IMCU with an IMCU generated from the in-memory enabled PF element containing the portion. To make this determination, a caching benefit value is generated for the IMCUs in derived cache 300, and the uncached in-memory enabled PF element. As shall be explained later, a relatively higher caching benefit value may indicate higher realizable cache containment. If the caching benefit value of the uncached portion is greater than one or more IMCUs in derived cache 300, the IMCUs may be replaced with an IMCU generated from the in-memory enabled PF element.

Caching Benefit Value

A caching benefit value for an IMCU or in-memory enabled PF element may comprise multiple values and may be generated based on a variety of factors that indicate a tendency to increase or decrease cache containment. For example, a caching benefit value for an IMCU may indicate a frequency for which in-memory enabled database data has been recently accessed. Caching PF data in derived cache 300 that is accessed more frequently may increase cache containment while caching PF data this is accessed less frequently may lessen cache containment.

A caching benefit value may also reflect how much in-memory enabled database data has recently changed. The more in-memory enabled database data in an IMCU is changed, the more PF side processing is needed to perform database operations on the in-memory enabled database data. Hence, cache containment is lower for IMCUs that contain more changed data, and higher for IMCUs that contain less changed data.

A caching benefit value may reflect the fraction of MF data that has changed in an IMCU. The greater the portion of MF data in an IMCU that has changed, the more PF side processing is needed to perform database operations on the in-memory enabled database data.

Figure 4:
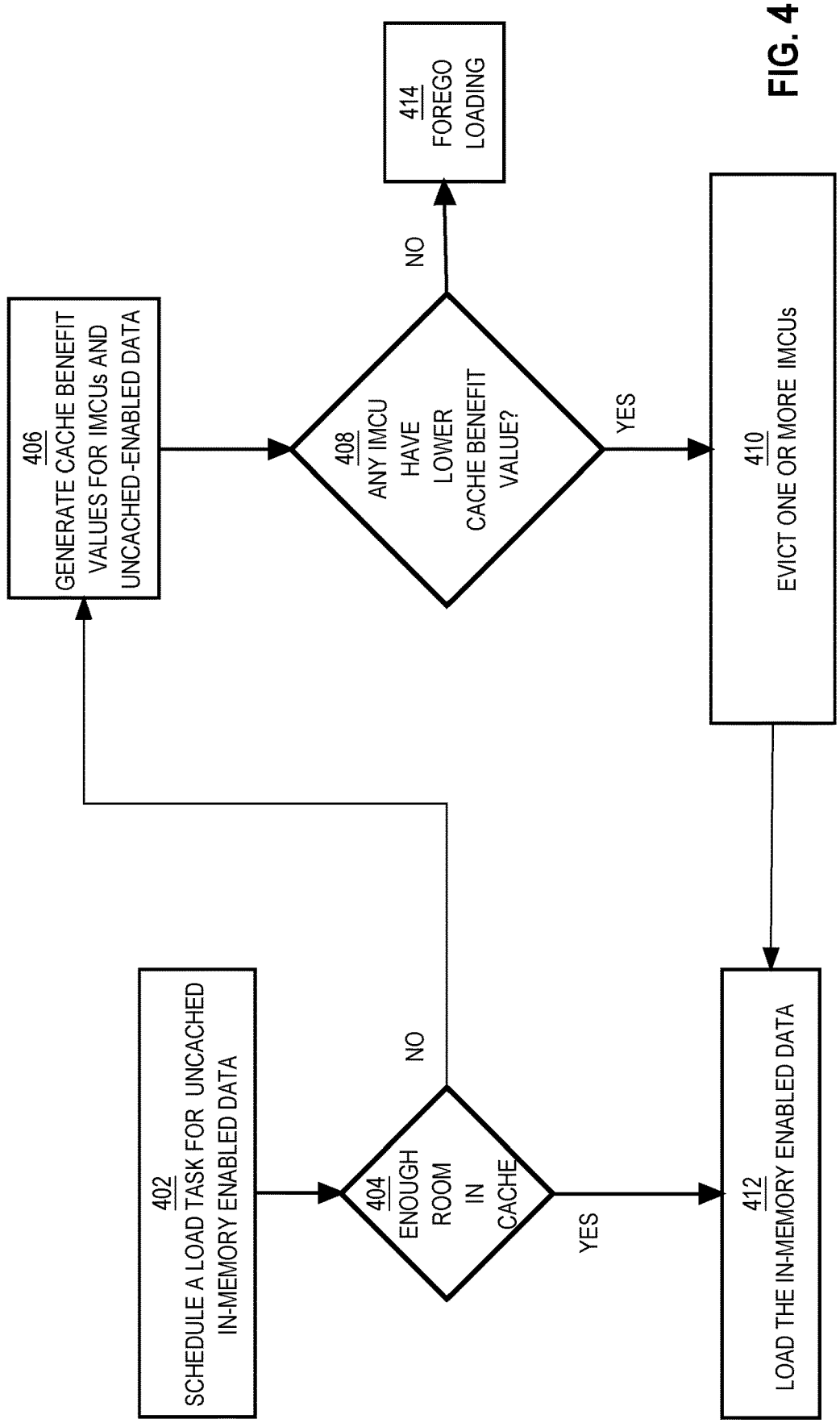
FIG. 4 is a flow diagram that depicts an example approach for automatic cache management, according to an embodiment of the present invention.

Periodic Performance Optimization through Heatmap Based Management of an In-Memory Area, section VALUES IN THE PERFORMANCE MODEL, describes similar or other ways that access statistics can be used to determine cache benefit value (referred to as "value" therein) of a IMCU or in-memory enabled PF element Procedure for on Demand Derived Cache Management FIG. 4 is a flow diagram that depicts an example procedure for on-demand derived cache management. The procedure is initiated in response to a derived cache miss for uncached-enabled data. Specifically, a database process executing a database statement within a database session on DBMS 100 determines that in-memory enabled database data required by the database statement is not cached in derived cache 300. The database process accesses the uncached-enabled data using PF-side processing and initiates the procedure for on-demand derived cache management depicted in FIG. 4.

At 402, the database process running within the session schedules a cache loading task. The remaining steps of the procedure are performed by a database process assigned the cache loading task.

At 404, it is determined whether there is available space (e.g., enough memory) in the derived cache 300 sufficient to load the in-memory enabled PF element. If there is such available space, then at 412, the in-memory enabled PF element is loaded into derived cache 300.

If there is insufficient available memory, then at 406, cache benefit values for the IMCUs in derived cache 300 and the uncached in-memory enabled PF element are generated.

At 408, it is determined whether any IMCUs have a lower cache benefit value than uncached in-memory enabled PF element. If no IMCU has a lower cache benefit value, then at 414, loading of the uncached in-memory enabled PF element is foregone.

At 410, when an IMCU has a lower cache benefit value, the IMCU is evicted from derived cache 300. At 412, the in-memory enabled PF element is loaded into derived cache 300.

Loading an IMCU into a derived cache requires substantial processing. The impact of such overhead can exceed the benefit of loading an in-memory enabled PF element even when the in-memory enabled PF element has a higher cache benefit value than at least one IMCU in derived cache 300 that could be evicted. To ensure that the benefit of loading an uncached in-memory enabled PF element at least offsets the cost of loading the in-memory enabled PF element, the determination at 408 may be based on a threshold difference. Such costs are described in Periodic Performance Optimization through Heatmap Based Management of an In-Memory Area, in section WEIGHTS OR COSTS IN THE PERFORMANCE MODEL. At 408, the determination may be whether any IMCU has a cache benefit value that is at least lower than that of the uncached in-memory enabled PF element by at least a threshold.

An uncached in-memory enabled PF element that is not loaded as a result of having an insufficient cache benefit value may be subsequently accessed to execute subsequent database statements. Such activity may increase the cache benefit value to a level that is greater than that of an IMCU in derived cache 300 (or greater by a threshold) and will be reflected in access statistics 130. Once this condition exists, when a derived cache miss is incurred for data in the uncached in-memory enabled PF element, the uncached in-memory enabled PF element may be loaded in place of any IMCU in derived cache 300, thereby loading the uncached in-memory enabled PF element when doing so can improve cache containment.

Removing one IMCU may not free enough room in derived cache 300 for the uncached-enabled data to be loaded. To account for this situation, a determination is made of the memory within derived cache 300 that is required for uncached in-memory enabled PF element to be loaded. If any IMCUs required to free up enough memory has a cache benefit value that is greater than the uncached-enabled data, the uncached in-memory enabled PF element is not loaded into memory.

In an embodiment, before evicting IMCUs, IMEUs are evicted. Eviction of IMCUs is not resorted to until eviction of IMEUs no longer frees enough memory in derived cache 300.

Contrast with Cache Management of Other Kinds of Caches

There are key differences between cache management of derived cache 300 and cache management of other kinds of caches that use "miss-and-replace" cache management. Generally, with miss-and-replace cache management, whenever a cache miss is experienced for a data item in the cache, if the there is insufficient room for a missed data item in the cache, a victim data item is selected to be removed from the cache and replaced with the missed data item. Often, the cache miss is incurred for an operation that requires the data item to be read into the cache in order to access the data item or complete performance of the operation.

On the other hand, with on-demand cache management of derived cache 300, access to uncached-enabled data that causes a derived cache miss may or may not cause the uncached-enabled data to be loaded into derived cache 300. If the derived cache miss causes the uncached-enabled data to be loaded, the uncached-enabled data is loaded into the derived cache asynchronously.

Furthermore, the derived cache miss is incurred by a database process computing a database statement that does not require loading into the derived cache 300 the uncached in-memory enabled PF element that includes the uncached-enabled data in order to complete execution of the database statement; the execution of the database statement and accessing of the database data needed for the execution may be completed before completing or even initiating loading the uncached in-memory enabled PF element. The database process may access the uncached-enabled data using PF-side processing. Thus, when a derived cache miss occurs for uncached-enabled data, the uncached-enabled data is accessed in buffer cache 106. If such access causes cache misses, data blocks in buffer cache 106 may be replaced with the data blocks needed for the PF-side processing. While the PF-side processing may be a less efficient way of accessing uncached-enabled data, the database process is able to complete execution of the database statement before and without loading the uncached-enabled data into derived cache 300.

Database Systems

Embodiments of the present disclosure are used in the context of database management systems ("DBMSs"). Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as table spaces, which are used for storing database object data.

A table space is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g., to store rows of a table, to store column values of a column). When records are read from persistent storage, a database block containing the record is copied into a database block buffer in volatile memory of a database server. A database block usually contains multiple rows, and control and formatting information, (e.g., offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements, as used herein, are intended to be shorthand for commands that, when executed by the DBMS, cause the DBMS to perform the corresponding actions.

In most cases, a DBMS executes database commands as one or more transactions or sets of indivisible operations performed on a database. Thus, after executing a given transaction, the database is left in a state where all the transaction's operations have been performed or none of the transaction's operations have been performed. While implementations may differ, most transactions are performed by 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage (e.g., shared access to a set of disk drives and database blocks stored thereon). The nodes in a multi-node database system may be in the form of a group of computers (e.g., work stations, personal computers) that are interconnected via a network. Alternatively, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
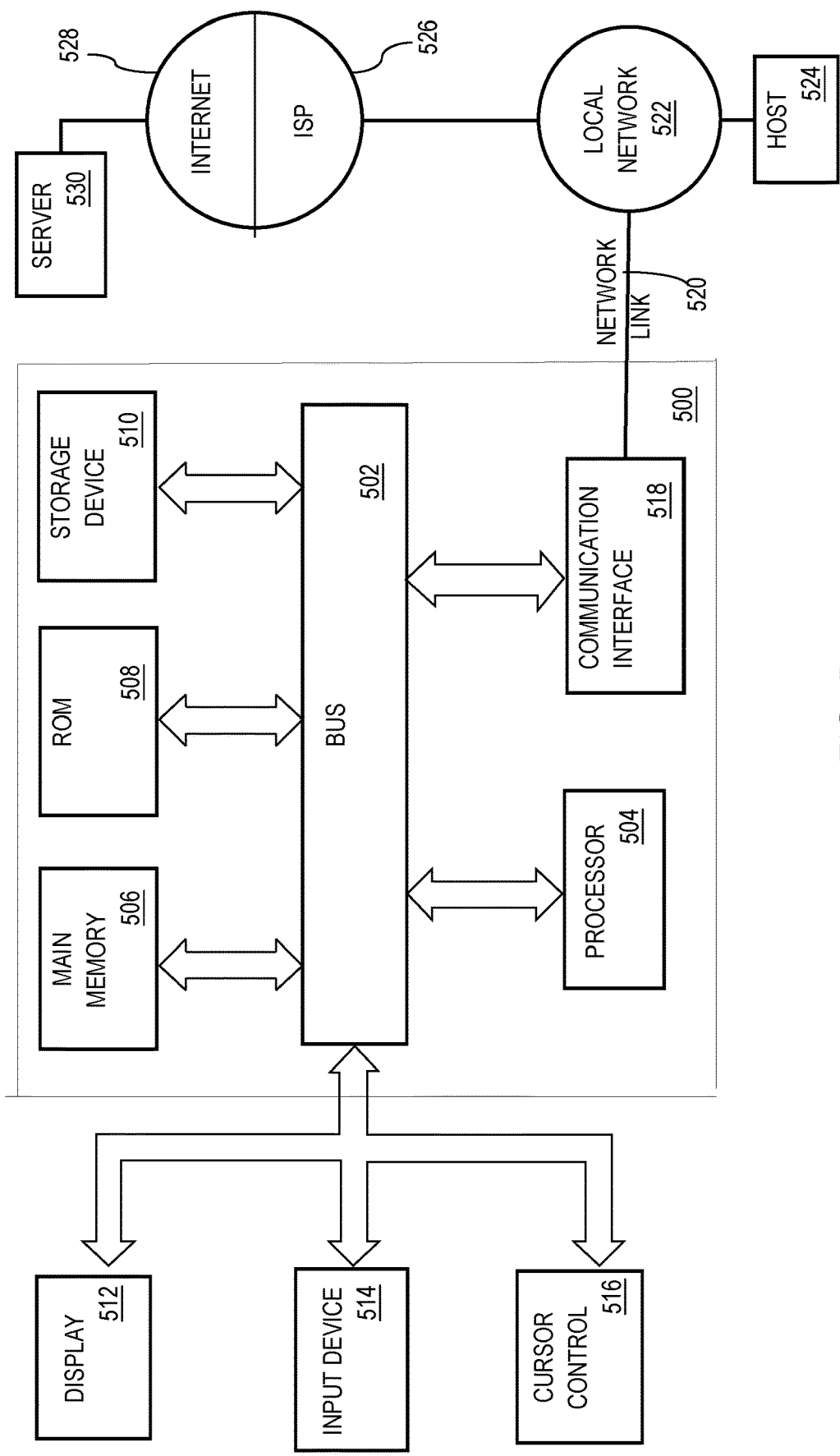
FIG. 5 depicts a computer system upon which embodiments may be implemented.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
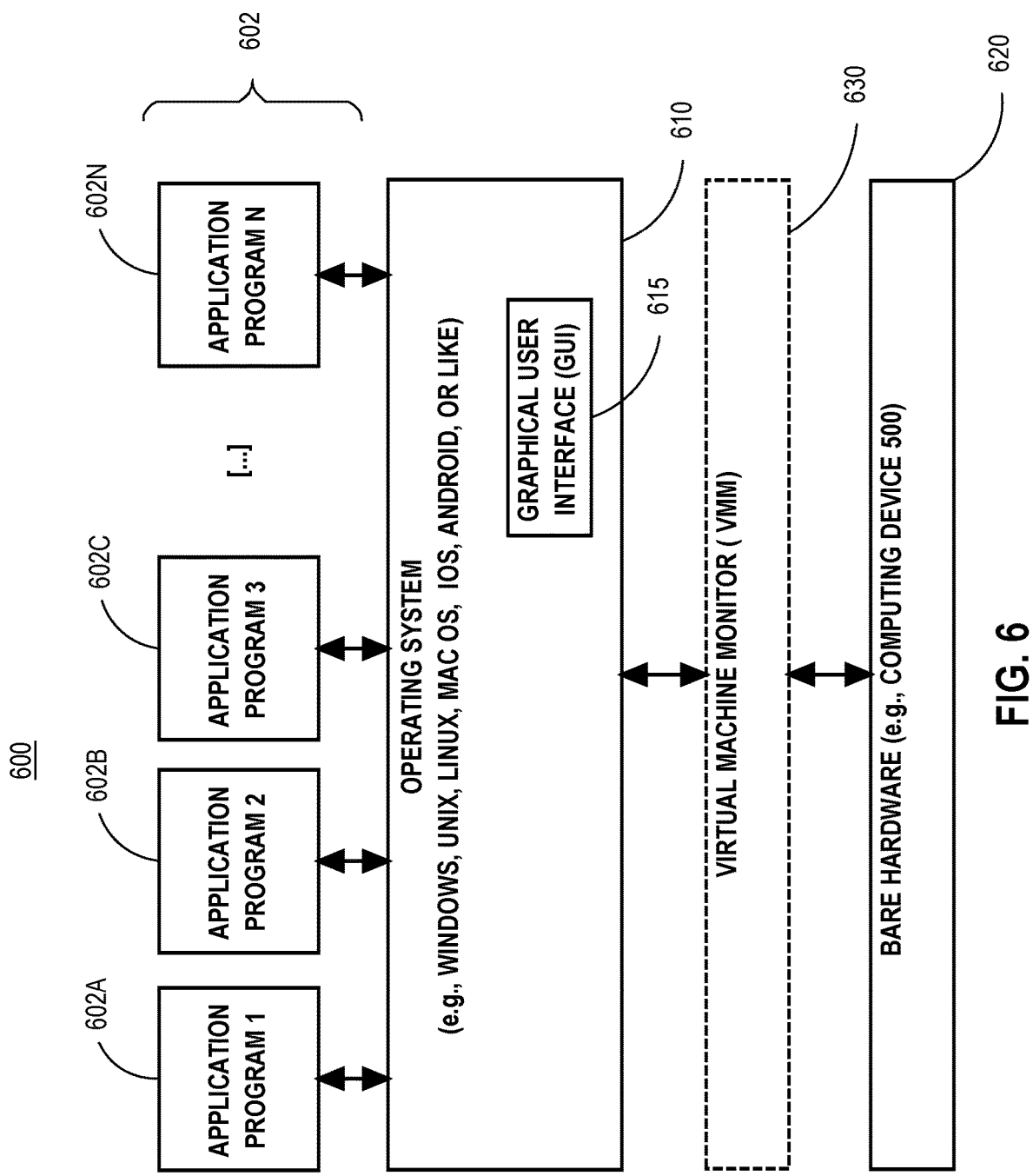
FIG. 6 depicts a software system for controlling the operation of the computer system, according to an embodiment of the present invention.

FIG. 6 is a block diagram of a software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 500. The applications or other software intended for use on system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of system 600. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
making a determination to load a particular in-memory enabled PF (persistent form) element of a database into a derived cache of a database server, said derived cache caching a plurality of IMCUs (in-memory compression units), said particular in-memory enabled PF element comprising one or more sets of contiguously stored data blocks of said database;
responsive to making the determination to load a particular in-memory enabled PF element of a database into a derived cache of a database server:
   determining whether there is at least a sufficient amount of available space in the derived cache for said particular in-memory enable PF element;
   if there is at least a sufficient amount of available space in the derived cache for said particular in-memory enabled PF element:
      determining whether a particular IMCU of said plurality of IMCUs has a caching benefit value that is less than a caching benefit value of said particular in-memory enabled PF element by at least a threshold;
   wherein:
      said caching benefit value of said particular IMCU decreases as a number of more recent changes to one or more in-memory enabled PF element of said particular IMCU increases, and
      said caching benefit value of said particular in-memory enabled PF decreases as a number of recent changes to the particular in-memory enabled PF increase;
   if said particular IMCU of said plurality of IMCUs has a caching benefit value that is less than a caching benefit value of said particular in-memory enabled PF element by at least the threshold:
      evicting said particular IMCU from said cache, and
      in response to evicting said particular IMCU from said cache, loading said particular in-memory enabled PF element into said derived cache; and wherein the method is performed by one or more computing devices.

2. The method of claim 1, wherein said making a determination to load a particular in-memory enabled PF element is performed in response to making a determination that in-memory enabled database data in said particular in-memory enabled PF element is not cached in said derived cache.

3. The method of claim 2, wherein said making said determination that in-memory enabled database data in said particular in-memory enabled PF element is not cached is performed while executing a database statement that requires access to said in-memory enabled database data.

4. The method of claim 3, wherein executing said database statement includes accessing said particular in-memory enabled database data in a buffer cache of said database server that caches PF form of said database.

5. The method of claim 1, further including generating caching benefit values based on access statistics describing access activity to said plurality of IMCUs and said particular in-memory enabled PF element, said caching benefit values including said caching benefit value for said particular IMCU and said caching benefit value for said particular in-memory enabled PF element.

6. The method of claim 5, wherein said access statistics includes recency access statistics indicating access to said plurality of IMCUs and said particular in-memory enabled PF element within a threshold window of time.

7. The method of claim 5, wherein said access statistics reflect how much said plurality of IMCUs and said particular in-memory enabled PF element have been modified.

8. The method of claim 5, wherein said access statistics reflect how much said plurality of IMCUs and said particular in-memory enabled PF element have been modified within a window of time.

9. The method of claim 5,
wherein said database comprises a plurality of in-memory enabled PF elements that include said particular in-memory enabled PF element;
wherein each IMCU of said plurality of IMCUs holds data from a respective in-memory enabled PF element of said plurality of in-memory enabled PF elements; and
wherein said access statistics tracks access at a level of granularity that corresponds to said plurality of in-memory enabled PF elements.

10. The method of claim 1, further including:
wherein said derived cache holds a plurality of in-memory expression units (IMEUs), each IMEU of said plurality of IMEUs corresponding to a respective IMCU of said plurality of IMCUs; and
wherein the method further includes, responsive to making said determination to load a particular in-memory enabled PF element of said database into said derived cache, removing at least one IMEU of said plurality of IMEUs from said derived cache.

11. One or more storage media comprising sequences of instructions, wherein said sequences of instructions, when executed by one or more processors, cause:
making a determination to load a particular in-memory enabled PF (persistent form) element of a database into a derived cache of a database server, said derived cache caching a plurality of IMCUs (in-memory compression units), said particular in-memory enabled PF element comprising one or more sets of contiguously stored data blocks of said database;

responsive to making the determination to load a particular in-memory enabled PF element of a database into a derived cache of a database server:
determining whether there is at least a sufficient amount of available space in the derived cache for said particular in-memory enable PF element;
if there is at least a sufficient amount of available space in the derived cache for said particular in-memory enabled PF element:
determining whether a particular IMCU of said plurality of IMCUs has a caching benefit value that is less than a caching benefit value of said particular in-memory enabled PF element by at least a threshold;
wherein:
said caching benefit value of said particular IMCU decreases as a number of more recent changes to one or more in-memory enabled PF element of said particular IMCU increases, and
said caching benefit value of said particular in-memory enabled PF decreases as a number of recent changes to the particular in-memory enabled PF increase;
if said particular IMCU of said plurality of IMCUs has a caching benefit value that is less than a caching benefit value of said particular in-memory enabled PF element by at least the threshold:
evicting said particular IMCU from said cache, and
in response to evicting said particular IMCU from said cache, loading said particular in-memory enabled PF element into said derived cache.

12. The one or more storage media of claim 11, wherein the sequences of instructions include instructions that, when executed by said one or more processors, cause said making a determination to load a particular in-memory enabled PF element to be performed in response to making a determination that in-memory enabled database data in said particular in-memory enabled PF element is not cached in said derived cache.

13. The one or more storage media of claim 12, wherein the sequences of instructions include instructions that, when executed by said one or more processors, cause said making said determination that in-memory enabled database data in said particular in-memory enabled PF element is not cached to be performed while executing a database statement that requires access to said in-memory enabled database data.

14. The one or more storage media of claim 13, wherein executing said database statement includes accessing said particular in-memory enabled database data in a buffer cache of said database server that caches PF form of said database.

15. The one or more storage media of claim 11, wherein the sequences of instructions include instructions that, when executed by said one or more processors, cause generating caching benefit values based on access statistics describing access activity to said plurality of IMCUs and said particular in-memory enabled PF element, said caching benefit values including said caching benefit value for said particular IMCU and said caching benefit value for said particular in-memory enabled PF element.

16. The one or more storage media of claim 15, wherein said access statistics includes recency access statistics indicating access to said plurality of IMCUs and said particular in-memory enabled PF element within a threshold window of time.

17. The one or more storage media of claim 15, wherein said access statistics reflect how much said plurality of IMCUs and said particular in-memory enabled PF element have been modified.

18. The one or more storage media of claim 15, wherein said access statistics reflect how much said plurality of IMCUs and said particular in-memory enabled PF element have been modified within a window of time.

19. The one or more storage media of claim 15,
   wherein said database comprises a plurality of in-memory enabled PF elements that include said particular in-memory enabled PF element;
   wherein each IMCU of said plurality of IMCUs holds data from a respective in-memory enabled PF element of said plurality of in-memory enabled PF elements; and
   wherein said access statistics tracks access at a level of granularity that corresponds to said plurality of in-memory enabled PF elements.

20. The one or more storage media of claim 11,
   wherein said derived cache holds a plurality of in-memory expression units (IMEUs), each IMEU of said plurality of IMEUs corresponding to a respective IMCU of said plurality of IMCUs; and
   wherein the sequences of instructions include instructions that, when executed by said one or more processors, cause: responsive to making said determination to load a particular in-memory enabled PF element of said database into said derived cache, removing at least one IMEU of said plurality of IMEUs from said derived cache.

* * * * *